(12) United States Patent
Omori et al.

(10) Patent No.: US 10,281,666 B2
(45) Date of Patent: May 7, 2019

(54) OPTICAL MODULE

(71) Applicant: Oclaro Japan, Inc., Sagamihara, Kanagawa (JP)

(72) Inventors: Koichi Omori, Chiba (JP); Hiroki Irie, Kanagawa (JP); Tetsuya Aoki, Kanagawa (JP)

(73) Assignee: Oclaro Japan, Inc., Kanagawa (JP)

( * ) Notice: Subject to any disclaimer, the term of this patent is extended or adjusted under 35 U.S.C. 154(b) by 0 days.

(21) Appl. No.: 15/635,482

(22) Filed: Jun. 28, 2017

(65) Prior Publication Data

US 2018/0011266 A1 Jan. 11, 2018

(30) Foreign Application Priority Data

Jul. 11, 2016 (JP) .................................. 2016-136710

(51) Int. Cl.
*G02B 6/42* (2006.01)

(52) U.S. Cl.
CPC .......... *G02B 6/4256* (2013.01); *G02B 6/421* (2013.01); *G02B 6/428* (2013.01); *G02B 6/4214* (2013.01); *G02B 6/4245* (2013.01); *G02B 6/4246* (2013.01); *G02B 6/4279* (2013.01); *G02B 6/4292* (2013.01); *G02B 6/4269* (2013.01); *G02B 6/4281* (2013.01); *G02B 6/4284* (2013.01)

(58) Field of Classification Search
None
See application file for complete search history.

(56) References Cited

U.S. PATENT DOCUMENTS

| | | | |
|---|---|---|---|
| 2008/0247713 A1 | 10/2008 | Tamura et al. | |
| 2009/0028557 A1* | 1/2009 | Togami | H05K 9/0058 398/39 |
| 2012/0148201 A1* | 6/2012 | Kondou | G02B 6/4245 385/92 |
| 2013/0243376 A1* | 9/2013 | Choraku | G02B 6/26 385/31 |
| 2014/0241662 A1* | 8/2014 | Park | H04B 10/27 385/14 |
| 2015/0010270 A1* | 1/2015 | Oppermann | G02B 6/34 385/14 |
| 2016/0231521 A1* | 8/2016 | Smith | G02B 6/383 |
| 2017/0176699 A1* | 6/2017 | Musk | G02B 6/4249 |
| 2018/0011266 A1* | 1/2018 | Omori | G02B 6/4246 |

FOREIGN PATENT DOCUMENTS

JP 2008-257094 A 10/2008

* cited by examiner

*Primary Examiner* — Jerry Rahll
(74) *Attorney, Agent, or Firm* — Mattingly & Malur, PC

(57) ABSTRACT

The invention provides an optical module which is less likely to be damaged, and can be assembled at low cost. The optical module comprises a housing having an electrical signal port for inputting and/or outputting an electrical signal and an optical signal port for inputting and/or outputting an optical signal, a first substrate arranged in the housing so as to connect to the electrical signal port, an optical fiber arranged in the housing so as to connect to the optical signal port, and a second substrate provided with an optical device which connects to the optical fiber to input the optical signal from the optical fiber and output the optical signal to the optical fiber, and arranged in the housing so as to electrically connect to the first substrate, and to be inclined with respect to a base plane of the housing.

10 Claims, 6 Drawing Sheets

OPTICAL MODULE

CROSS-REFERENCE TO RELATED APPLICATION

The present application claims priority from Japanese application JP 2016-136710, filed on Jul. 11, 2016, the content of which is hereby incorporated by reference into this application.

BACKGROUND OF THE INVENTION

1. Field of the Invention

The invention relates to an optical module.

2. Description of the Related Art

An optical module is known that is formed by integrating a light emitting module which converts an electrical signal to an optical signal with a light receiving module which converts an optical signal to an electrical signal. The optical module comprises an electrical signal port for the electrical signal and an optical signal port for the optical signal.

JP 2008-257094A discloses an optical transmission module comprising a housing and an inclination portion on the inner surface of the housing on which a circuit board is arranged.

SUMMARY OF THE INVENTION

Either one of the optical and electrical signals is input to the optical module, then converted by an optical device of the optical module to another to be output. The optical device may be disposed on a substrate arranged in the optical module. If the substrate is arranged parallel to the base plane of the optical module, the optical signal port for the optical signal may be connected to the optical device via an optical fiber. In this case, the optical fiber is required to be bent at about a 90 degree angle, which would impose a load on the optical fiber, thereby damaging the optical fiber.

Alternatively, the substrate may be arranged parallel to the base plane of the optical module, the optical signal port may be connected to the optical device via an optical component such as a mirror such that the optical signal is guided from the optical signal port to the interior of the optical module. In this case, the optical component is required to be aligned to the substrate precisely, which may increase cost of assembling the optical module.

Alternatively, as described in JP 2008-257094A, the substrate may be arranged to be inclined with respect to the base plane of the optical module. However, such arrangement may make it difficult to connect the electrical signal port to the substrate because the electrical signal port is arranged parallel to the base plane of the optical module so as to obey a standard of the optical module.

Therefore, the invention aims at providing an optical module which is less likely to be damaged, and can be assembled at low cost.

(1) To solve the above-mentioned problem, an optical module according to the invention comprises a housing having an electrical signal port for an electrical signal and an optical signal port for an optical signal, a first substrate arranged in the housing so as to connect to the electrical signal port, an optical fiber arranged in the housing so as to connect to the optical signal port, and a second substrate provided with an optical device which connects to the optical fiber to input the optical signal from the optical fiber and output the optical signal to the optical fiber, and arranged in the housing so as to electrically connect to the first substrate and to be inclined with respect to a base plane of the housing.

(2) The optical module according to (1) wherein the second substrate is inclined with respect to the base plane of the housing at an angle equal to or more than 70 degree and less than 90 degree.

(3) The optical module according to (1) or (2) wherein the housing comprises a planar portion inclined with respect to the base plane of the housing, the second substrate being fixed to the planar portion.

(4) The optical module according to (3) wherein the planar portion comprises a first planar portion on a first inner wall and a second planar portion on a second inner wall opposite to the first inner wall, and spaced apart from the first planar portion, the second substrate being fixed to a fixing plate extending from the first planar portion to the second planar portion.

(5) The optical module according to (4) wherein the second substrate is a flexible substrate, and extends through a space surrounded by the fixing plate, the base plane of the housing, and the first and second planar portions to electrically connect to the first substrate.

(6) The optical module according to (5) wherein the second substrate is electrically connected both to a front surface and a back surface of the first substrate and arranged in a U-shaped manner such that the second substrate surrounds the front surface of the first substrate, the fixing plate, and the back surface of the first substrate.

(7) The optical module according to any one of (4)-(6) wherein the fixing plate is screwed both to the first and second planar portions.

(8) The optical module according to any one of (2)-(7) wherein the housing further comprises a heat dissipating member, the second substrate being held between the heat dissipating member and the planar portion.

BRIEF DESCRIPTION OF THE DRAWINGS

The invention offers an optical module which is less likely to be damaged, and can be assembled at low cost.

The invention will be described in detail with reference to the following drawings in which.

Figure 1:
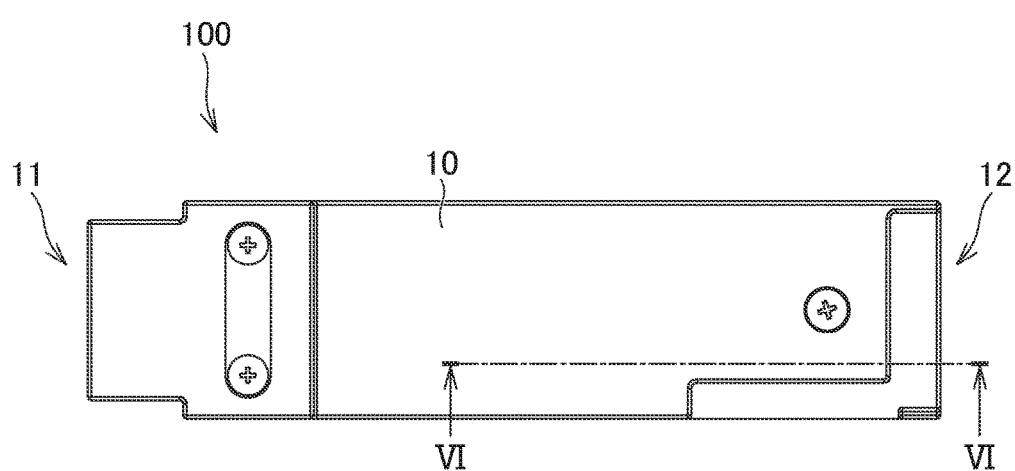
FIG. 1 shows a plan view of an optical module according to an embodiment of the invention.

Like reference numerals designate the same or similar elements throughout all views so as to avoid any redundant description of the same or similar elements. It should be noted that the drawings are not to precise scale and may be exaggerated in thickness of lines or sizes or components for descriptive convenience and clarity only.

DETAILED DESCRIPTION OF THE INVENTION

FIG. 1 shows a plan view of an optical module 100 according to an embodiment of the invention. The optical module 100 comprises a housing 10 having an electrical signal port 12 for an electrical signal and an optical signal port 11 for an optical signal. The housing 10 is made of metal, and blocks electromagnetic radiation generated inside the housing 10.

Figure 2:
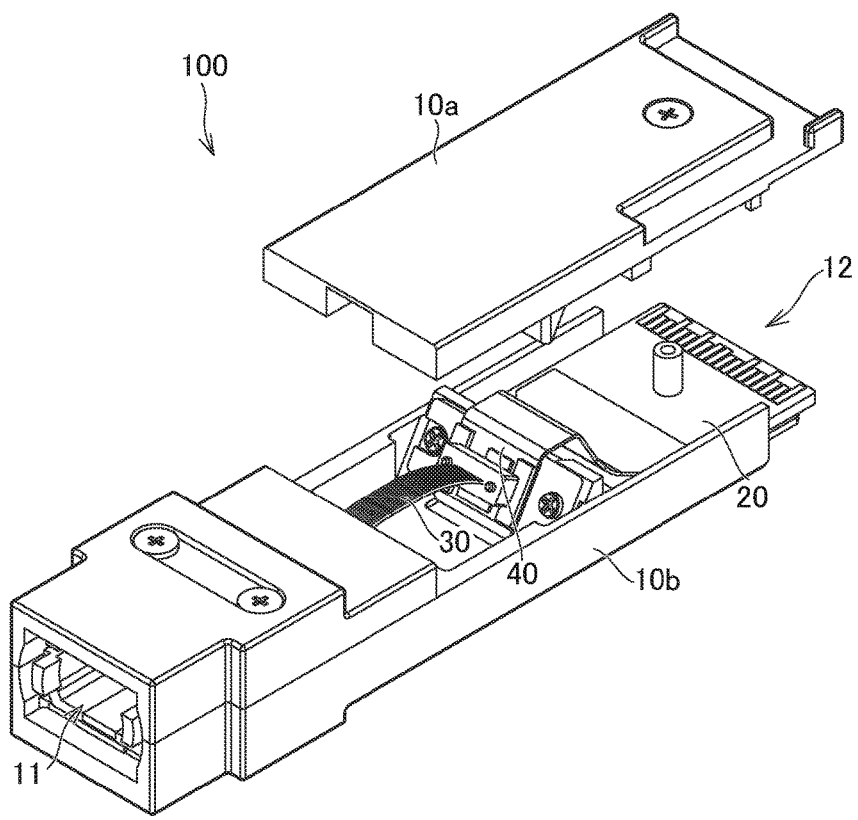
FIG. 2 shows an exploded perspective view of an optical module according to an embodiment of the invention.

FIG. 2 shows an exploded perspective view of the optical module 100 according to an embodiment of the invention. In FIG. 2, the housing 10 is shown with its exploded state. The optical module 100 comprises the housing 10, a first substrate 20, an optical fiber 30 and a second substrate 40. The housing 10 consists of an upper part 10a and a lower part 10b, and includes the first substrate 20 such that the first substrate 20 is held between the upper part 10a and the lower part 10b. The upper part 10a and the lower part 10b are fixed with each other by screws.

The first substrate 20 is arranged in the housing 10 so as to connect to the electrical signal port 12. The first substrate 20 may be a planar PCB (Print Circuit Board) and disposed along the base plane of the housing 10. The first substrate 20 may be arranged in the housing 10 arbitrarily. However, a projecting part of the first substrate 20 into the electrical signal port 12 to connect to an external connector is preferably parallel to the base plane of the housing 10 from the point of view of a standard of the optical module 100.

The optical fiber 30 is arranged in in the housing 10 and connected to the optical signal port 11. The optical fiber has a light transmission end and a light reception end. Each end may be a fiber array of optical fibers. The optical fiber 30 may be curved. However, curvature of the optical fiber 30 is preferably small so as to prevent the optical fiber 30 from being bent beyond an allowed curvature of the optical fiber 30 to degrade an optical signal passing through the optical fiber 30 or damage the optical fiber 30.

The second substrate 40 is arranged in the housing 10 such that the second substrate 40 is provided with an optical device, electrically connected to the first substrate 20, and inclined with respect to the base plane of the housing 10. The second substrate 40 may be a flexible substrate which can be curved. The second substrate 40 has a portion to which a connector of the optical fiber 30 is connected. The portion is inclined with respect to the base plane of the housing 10.

According to the optical module 100 of this embodiment, the second substrate 40 is arranged such that the portion of the second substrate 40 to which the optical fiber 30 is connected is inclined with respect to the base plane of the housing 10. Such arrangement decreases curvature of the optical fiber 30 compared to curvature when the portion is parallel to the base plane of the housing 10, thereby realizing the optical fiber 30 less likely to be damaged. Also the optical module 100 of this embodiment eliminates any need of an optical element such as a mirror for connecting an optical signal to the second substrate 40, thus the optical element does not need to be aligned with the second substrate precisely. As a result, the optical module 100 can be assembled at low cost.

It is also contemplated that the second substrate 40 is arranged such that the second substrate 40 is vertical to the base plane of the optical module 100 so as to directly connect the optical signal port 11 to the optical device. However, in this case, an RF signal is applied to a driver IC (Integrated Circuit) and wiring on the second substrate 40, which generates electromagnetic radiation, and then the electromagnetic radiation is emitted from the optical signal port 11. The electromagnetic radiation may cause crosstalk between the optical module 100 and other optical modules. According to the optical module 100 of this embodiment, the second substrate 40 is arranged in the housing 10 formed of metal, so that the electromagnetic radiation generated from the driver IC and wiring is blocked. As a result, the optical module 100 offers reduction in the crosstalk between the optical module 100 and other optical modules.

According to the optical module 100 of this embodiment, the substrate incorporated into the housing 10 is divided into the first substrate 20 and the second substrate 40. If a substrate had approximately the same size as that of a combined substrate of the first substrate 20 and the second substrate 40, and was incorporated into the housing 10, degree of inclination of the substrate would significantly be limited. According to the optical module 100 of this embodiment, the substrate incorporated into the housing 10 is divided, so that degree of inclination angle of the substrate increases. Increase of the inclination angle suppresses curvature of the optical fiber 30, thereby preventing the optical fiber 30 from being damaged.

Figure 6:
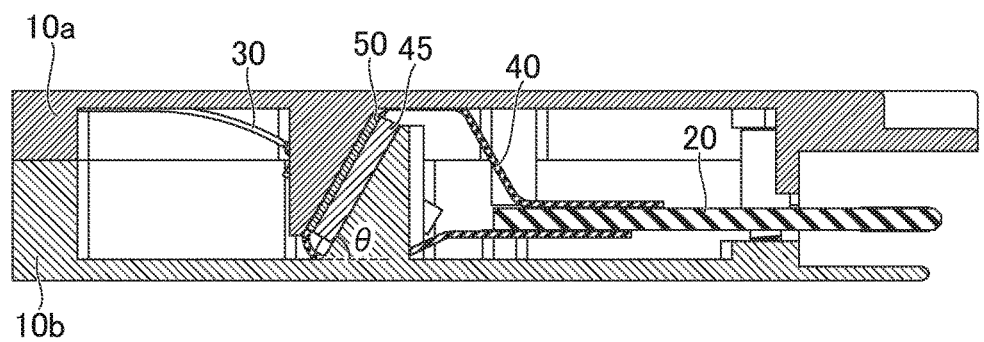
FIG. 6 shows a cross-sectional view of an optical module according to an alternative embodiment of the invention.

The second substrate 40 is inclined with respect to the base plane of the housing 10 at an angle equal to or more than a 70 degree angle and less than a 90 degree angle. Since the second substrate 40 is inclined with respect to the base plane of the housing 10 at an angle equal to or more than a 70 degree angle, curvature of the optical fiber 30 becomes sufficiently small. Thus, the optical fiber 30 is less likely to be damaged. Since the second substrate 40 is inclined with respect to the base plane of the housing 10 at an angle equal to or less than a 90 degree angle, the height of the second substrate 40 can be suppressed. Suppression of the height reduces the vertical size of the housing, thereby downsizing the optical module 100. An inclination angle θ of the second substrate 40 with respect to the base plane of the housing 10 is shown in FIG. 6.

Figure 3:
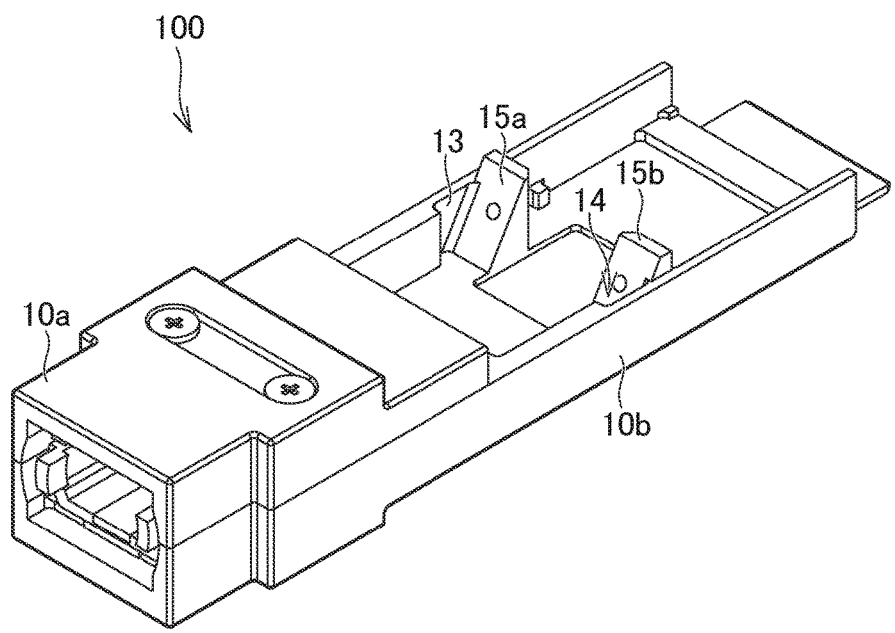
FIG. 3 shows a perspective view of a planar portion of an optical module according to an embodiment of the invention.

FIG. 3 shows a perspective view of a planar portion 15 of the optical module 100 according to an embodiment of the invention. In FIG. 3, an upper part 10a of the housing 10 is partially cutoff so as to show the inside of the housing 10. The housing 10 comprises the planar portion 15 inclined with respect to the base plane of the housing 10. As shown in FIGS. 2-3, the second substrate 40 is fixed to the planar portion 15. The planar portion 15 of the housing 10 facilitates alignment of the second substrate 40. Especially, if the second substrate 40 is a flexible substrate, the second substrate 40 can be arranged such that the second substrate 40 is inclined at a suitable inclination angle.

Figure 4:
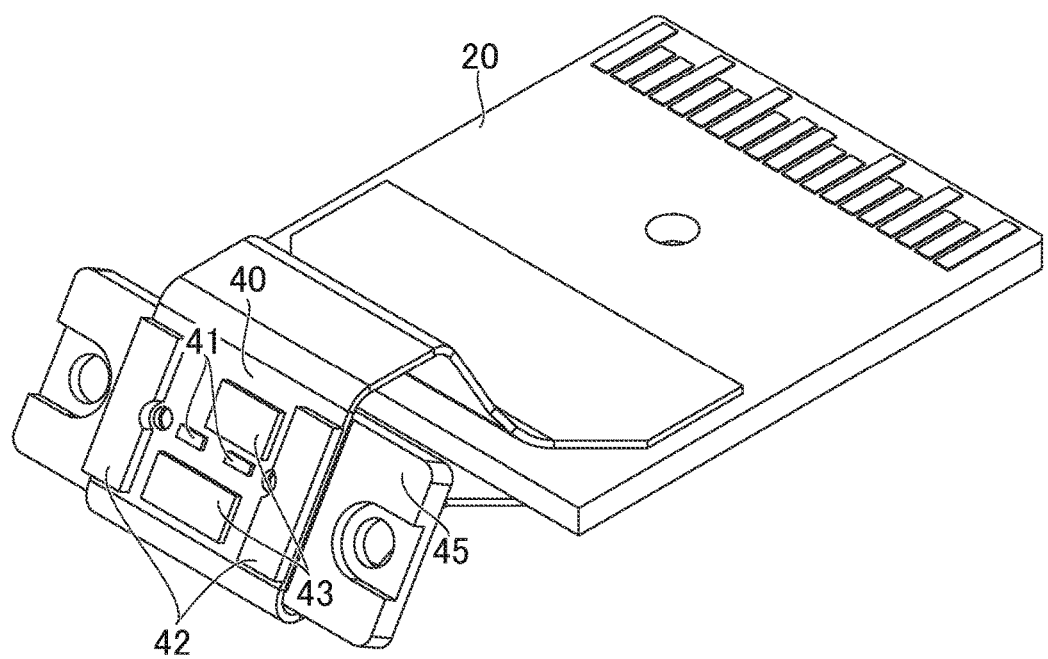
FIG. 4 shows a perspective view of first and second substrates of an optical module according to an embodiment of the invention, seen from the front surface.

FIG. 4 shows a perspective view of the first substrate 20 and the second substrate 40 of the optical module according 100 to an embodiment of the invention, seen from the front surface. As shown in FIGS. 2-4, the planar portion 15 comprises a first planar portion 15a on a first inner wall 13 of the housing 10, and a second planar portion 15b on a second inner wall 14 of the housing 10 opposite to the first inner wall 13, and spaced apart from the first planar portion 15a. The second substrate 40 is fixed to a fixing plate 45 extending from the first portion 15a to the second planar portion 15b. The second substrate 40 is provided with an optical device 41 into which an optical signal is input and/or which outputs an optical signal, a spacer 42 for adjusting a distance between a connector of the optical fiber 30 and the optical device 41, and an IC 43 (a driver IC at a transmission side and an amplifier IC at a reception side) for controlling the optical device 41. A direction in/from which the optical device 41 emits/receives light (hereinafter, referred to as a "light direction") is designed to coincide with a direction of extending the optical fiber 30 toward a connection end of the second substrate 40 (hereinafter, referred to as a "fiber direction"). Coincidence of the light direction with the fiber direction enables optical connection of the optical fiber 30 with the optical device 41 conveniently and precisely.

The first and second planar portions 15a, 15b are formed on the lower part 10b of the housing 10 such that both the first and second planar portions 15a, 15b form a common inclination angle with respect to the base plane of the housing 10. The first and second planar portions 15a, 15b each have respective threaded holes for fastening the fixing plate 45 to both the first and second planar portions 15a, 15b. The fixing plate 45 is formed of metal and screwed both to the first and second planar portions 15a, 15b. The second substrate 40 is fixed to the fixing plate 45. In assembling the optical module 100, the second substrate 40 is fixed to the fixing plate 45, then the fixing plate 45 is screwed both to the first and second planar portions 15a, 15b.

According to the optical module 100 of this embodiment, the second substrate 40 can be fixed to the fixing plate 45 located both on the first and second planar portions 15a, 15b beforehand, and the common inclination angle of both the first and second planar portions 15a, 15b defines an inclination angle of the second substrate 40. Thus, the optical module 100 easily provides a desirable inclination angle of the second substrate 40, therefore facilitating assembly of the optical module 100.

According to the optical module 100 of one embodiment, both the first and second planar portions 15a, 15b are inclined with respect to the base plane of the housing 10. Thus, the optical module 100 facilitates screwing of the fixing plate 45 to both the first and second planar portions 15a, 15b compared to screwing when both the first and second planar portions 15a, 15b are vertical to the base plane of the housing 10.

Figure 5:
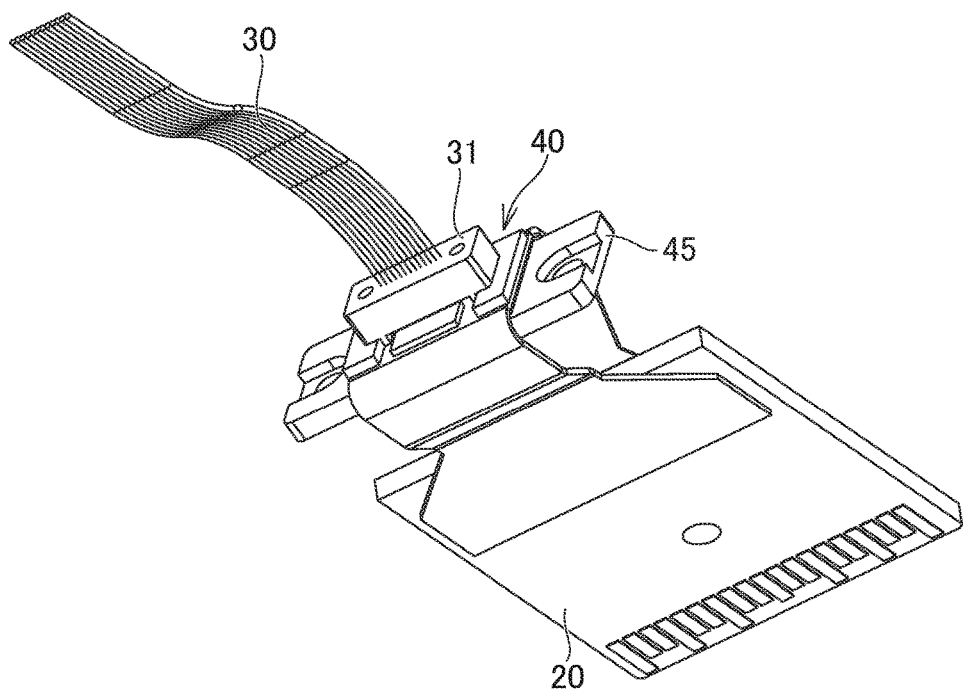
FIG. 5 shows a perspective view of first and second substrates of an optical module according to an embodiment of the invention, seen from the back surface.

FIG. 5 shows a perspective view of the first and second substrates 20, 40 of the optical module 100 according to an embodiment of the invention, seen from the back surface. In FIG. 5, the optical fiber 30 is connected to the second substrate 40. The second substrate 40 is a flexible substrate. As shown in FIGS. 2, 3 and 5, the second substrate 40 extends through a space surrounded by the fixing plate 45, the base plane of the housing 10, the first and second planar portions 15a, 15b to electrically connect to the first substrate 20. The second substrate 40 surrounds the fixing plate 45, and extends through a gap between the fixing plate 45 and the base plate of the housing 10 to the back surface of the first substrate 20 to electrically connect to the back surface of the first substrate 20. The first substrate 20 comprises wiring formed both on the front and back surfaces of the first substrate 20. The second substrate 40 is electrically connected to the wiring formed on the back surface of the first substrate 20.

The second substrate 40 is configured to extend through the space surrounded by the fixing plate 45, the base plane of the housing 10, the first and second planar portions 15a, 15b to electrically connect to the first substrate 20. Such configuration enables the second substrate 40 to be arranged without excess folding of the second substrate 40.

The second substrate 40 is electrically connected both to the front and back surfaces of the first substrate 20 and arranged in a U-shaped manner such that the second substrate 40 surrounds the front surface of the first substrate 20, the fixing plate 45, and the back surface of the first substrate 20. The second substrate 40 is electrically connected to the respective wiring formed on the front and back surfaces of the first substrate 20. In assembling the optical module 100, the second substrate 40 is electrically connected both to the front and back surfaces of the first substrate 20, then the second substrate 40 is fixed to the fixing plate 45, and finally the fixing plate 45 is screwed both to the first and second planar portions 15a, 15b.

The second substrate 40 is arranged in a U-shaped manner to electrically connect both to the front and back surfaces of the first substrate 20. Such arrangement eliminates any need of folding the second substrate 40 excessively. Furthermore, such arrangement can make use of the wiring formed both on the front and back surfaces of the first substrate 20 to increase the number of electrical signal lines while maintaining the width of the first substrate 20. Although the present embodiment describes the second substrate 40 as a flexible substrate, the second substrate 40 may be a PCB. If the second substrate 40 is a PCB, a flexible substrate may be used for electrically connecting the second substrate 40 with the first substrate 20.

FIG. 6 shows a cross-sectional view of the optical module 100 according to an alternative embodiment of the invention. In FIG. 6, a cross section of the optical module 100 along a VI-VI line is shown. The housing 10 comprises a heat dissipating member 50. The second substrate 40 is held between the heat dissipating member 50 and the planar portion 15. Specifically, the heat dissipating member 50 is disposed on the upper part 10a of the housing 10 so as to be inclined at a corresponding inclination angle to the inclination angle of the first and second planar portions 15a, 15b of the lower part 10b of the housing. The second substrate 40 is held between the heat dissipating member 50 and the first and second planar portions 15a, 15b. The second substrate 40 is fixed to the base plane of the housing 10 at an inclination angle θ with respect to the base plane of the housing 10. The heat dissipating member 50 may be formed of a planar metal, and transfer heat generated from the second substrate 40 to the housing 10 to cool down the second substrate 40. Although this alternative embodiment describes the heat dissipating member 50 as a metal plate, the heat dissipating member 50 may be for example thermal grease.

According to the optical module 100 according to this alternative embodiment, the heat dissipating member 50 efficiently dissipates heat generated from the optical device 41 and the driver IC 43. Since the second substrate 40 is held between the heat dissipating member 50 and the planar portion 15, the second substrate 40 adhere to the heat dissipating member 50. As a result, heat dissipation effect of the optical module 100 is improved.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An optical module comprising:
   a housing having an electrical signal port for inputting and/or outputting an electrical signal, and an optical signal port for inputting and/or outputting an optical signal;
   a first substrate arranged in the housing so as to connect to the electrical signal port;
   an optical fiber arranged in the housing so as to connect to the optical signal port; and
   a second substrate provided with an optical device which connects to the optical fiber to input the optical signal from the optical fiber and output the optical signal to the optical fiber, and arranged in the housing so as to electrically connect to the first substrate and to be inclined with respect to a base plane of the housing and the first substrate.

2. The optical module according to claim 1, wherein the second substrate is inclined with respect to the base plane of the housing at an angle equal to or more than 70 degree and less than 90 degree.

3. The optical module according to claim 1, wherein the housing comprises a planar portion inclined with respect to the base plane of the housing, the second substrate being fixed to the planar portion.

4. The optical module according to claim 3, wherein the planar portion comprises a first planar portion on a first inner wall and a second planar portion on a second inner wall opposite to the first inner wall, which is spaced from the first planar portion, the second substrate being fixed to a fixing plate located both on the first and second planar portions.

5. The optical module according to claim 4, wherein the second substrate is a flexible substrate, and extends through a space surrounded by the fixing plate, the base plane of the housing, the first and second planar portions to electrically connect to the first substrate.

6. The optical module according to claim 5, wherein the second substrate is electrically connected both to a front surface and a back surface of the first substrate and arranged in a U-shaped manner such that the second substrate surrounds the front surface of the first substrate, the fixing plate, and the back surface of the first substrate.

7. The optical module according to claim 4, wherein the fixing plate is screwed both to the first and second planar portions.

8. The optical module according to claim 3, wherein the housing further comprises a heat dissipating member, the second substrate being held between the heat dissipating member and the planar portion.

9. An optical module comprising:
a housing having an electrical signal port for inputting and/or outputting an electrical signal, and an optical signal port for inputting and/or outputting an optical signal;
a first substrate arranged in the housing so as to connect to the electrical signal port;
an optical fiber arranged in the housing so as to connect to the optical signal port; and
a second substrate provided with an optical device which connects to the optical fiber to input the optical signal from the optical fiber and output the optical signal to the optical fiber, and arranged in the housing so as to electrically connect to the first substrate and to be inclined with respect to a base plane of the housing,
wherein the housing comprises a planar portion inclined with respect to the base plane of the housing, the second substrate being fixed to the planar portion,
wherein the planar portion comprises a first planar portion on a first inner wall and a second planar portion on a second inner wall opposite to the first inner wall, which is spaced from the first planar portion, the second substrate being fixed to a fixing plate located both on the first and second planar portions,
wherein the second substrate is a flexible substrate, and extends through a space surrounded by the fixing plate, the base plane of the housing, the first and second planar portions to electrically connect to the first substrate, and
wherein the second substrate is electrically connected both to a front surface and a back surface of the first substrate and arranged in a U-shaped manner such that the second substrate surrounds the front surface of the first substrate, the fixing plate, and the back surface of the first substrate.

10. An optical module comprising:
a housing having an electrical signal port for inputting and/or outputting an electrical signal, and an optical signal port for inputting and/or outputting an optical signal;
a first substrate arranged in the housing so as to connect to the electrical signal port;
an optical fiber arranged in the housing so as to connect to the optical signal port; and
a second substrate provided with an optical device which connects to the optical fiber to input the optical signal from the optical fiber and output the optical signal to the optical fiber, and arranged in the housing so as to electrically connect to the first substrate and to be inclined with respect to a base plane of the housing,
wherein the housing comprises a planar portion inclined with respect to the base plane of the housing, the second substrate being fixed to the planar portion,
wherein the planar portion comprises a first planar portion on a first inner wall and a second planar portion on a second inner wall opposite to the first inner wall, which is spaced from the first planar portion, the second substrate being fixed to a fixing plate located both on the first and second planar portions, and
wherein the fixing plate is screwed both to the first and second planar portions.

* * * * *